(12) United States Patent
Crone (10) Patent No.: US 10,582,093 B2
(45) Date of Patent: Mar. 3, 2020

(54) ACTIVE STABILISATION SYSTEM (71) Applicant: MOVR DESIGNS LIMITED, Staffordshire (GB)

(72) Inventor: David James Crone, Birmingham (GB)

(73) Assignee: MOVR DESIGNS LIMITED, Staffordshire (GB)

(*) Notice: Subject to any disclaimer, the term of this patent is extended or adjusted under 35 U.S.C. 154(b) by 0 days.

(21) Appl. No.: 15/773,681

(22) PCT Filed: Oct. 12, 2016

(86) PCT No.: PCT/GB2016/053159
§ 371 (c)(1),
(2) Date: May 4, 2018

(87) PCT Pub. No.: WO2017/077267
PCT Pub. Date: May 11, 2017

(65) Prior Publication Data
US 2018/0332197 A1    Nov. 15, 2018

(30) Foreign Application Priority Data

Nov. 6, 2015 (GB) .................................. 1519650.4

(51) Int. Cl.
*B64C 17/06* (2006.01)
*H04N 5/225* (2006.01)
(Continued)

(52) U.S. Cl.
CPC .......... *H04N 5/2251* (2013.01); *F16M 11/10* (2013.01); *F16M 11/105* (2013.01);
(Continued)

(58) Field of Classification Search
CPC ..... G05D 1/0094; G03B 17/561; F16M 11/18
See application file for complete search history.

(56) References Cited

U.S. PATENT DOCUMENTS 9,030,149 B1    5/2015    Chen et al.
2007/0050139 A1    3/2007    Sidman
(Continued)

FOREIGN PATENT DOCUMENTS

CN    204422953 U    6/2015
DE    102012203834 B3    6/2013
(Continued)

OTHER PUBLICATIONS

Search and Exam Report dated May 4, 2016 for corresponding GB Application No. 1519650.4.
(Continued)

*Primary Examiner* — Karen Masih
(74) *Attorney, Agent, or Firm* — David D. Brush; Westman, Champlin & Koehler, P.A.

(57) ABSTRACT

The disclosure relates to an active stabilisation system for stabilising a payload. Embodiments can include: a first motor having a stator connected to a system mount and a rotor configured for rotation about a first axis in a first plane of rotation; a second motor having a stator connected with a first connection link to the rotor of the first motor and a rotor configured for rotation about a second axis in a second plane of rotation, the second plane of rotation intersecting with the first motor; a third motor having a stator connected with a second connection link to the rotor of the second motor and a rotor configured for rotation about a third axis in a third plane of rotation; and a payload mount connected to the rotor of the third motor and configured for attachment to a payload.

8 Claims, 6 Drawing Sheets

(51) Int. Cl.
*H04N 5/232* (2006.01)
*H04N 5/247* (2006.01)
*F16M 11/10* (2006.01)
*F16M 11/18* (2006.01)
*F16M 11/20* (2006.01)
*G03B 17/56* (2006.01)

(52) U.S. Cl.
CPC ......... *F16M 11/18* (2013.01); *F16M 11/2064* (2013.01); *G03B 17/561* (2013.01); *H04N 5/2257* (2013.01); *H04N 5/2328* (2013.01); *H04N 5/23238* (2013.01); *H04N 5/23258* (2013.01); *H04N 5/247* (2013.01); *F16M 2200/041* (2013.01); *F16M 2200/044* (2013.01)

(56) References Cited

U.S. PATENT DOCUMENTS

| | | | |
|---|---|---|---|
| 2009/0257741 A1 | 10/2009 | Greb et al. | |
| 2014/0270744 A1 | 9/2014 | Webb et al. | |
| 2015/0261070 A1 | 9/2015 | Feng et al. | |
| 2016/0246162 A1* | 8/2016 | Niemeyer | F16M 11/18 |

FOREIGN PATENT DOCUMENTS

| | | |
|---|---|---|
| WO | 2013067335 A1 | 5/2013 |
| WO | 2014023779 A1 | 2/2014 |
| WO | 2014071400 A1 | 5/2014 |
| WO | 2015101822 A1 | 7/2015 |
| WO | 2015119488 A1 | 8/2015 |

OTHER PUBLICATIONS

Search and Exam Report dated Dec. 14, 2016 for corresponding GB Application No. 1618245.3.
PCT International Search Report dated Jan. 23, 2017 for corresponding PCT Application No. PCT/GB2016/053159.
PCT Written Opinion dated Jan. 23, 2017 for corresponding PCT Application No. PCT/GB2016/053159.
Chinese Search Report dated Apr. 8, 2019 for corresponding Chinese Application No. 201680077483.2.
English translation of the Chinese Office Action, dated Apr. 17, 2019 for corresponding Chinese Application No. 201680077483.2.

* cited by examiner

ACTIVE STABILISATION SYSTEM

CROSS-REFERENCE OF RELATED APPLICATION

This application is a Section 371 National Stage Application of International Application No. PCT/GB2016/053159, filed Oct. 12, 2016, which is incorporated by reference in its entirety and published as WO 2017/077267 A1 on May 11, 2017 and which claims priority of British Application No. 1519650.4, filed Nov. 6, 2015.

FIELD

The invention relates to an active stabilisation system for stabilising a payload, for example to stabilise a video camera for hand-held or vehicle-mounted applications.

BACKGROUND

In many applications it is desirable to stabilise a payload, for example to limit the effect of vibrations or other movement. This is particularly relevant where the payload is a video camera. The rise of compact and rugged video cameras, often known as active cameras, has allowed people to record their experiences whilst on the move in a much wider range of environments. When carried by drones, for example, such cameras allow for the recording of unprecedented "bird's eye" views of desired scenes. It is already possible to stream recordings from such video cameras directly to a virtual reality headset or projection room, potentially opening up a new world of video interactivity. Such direct streams can, however, be disorienting and nausea-inducing, due to unexpected movements of the camera's field of view.

Video recordings taken whilst a camera is moving tend to be unstable, resulting in jerky movements due to unwanted movement or vibration of the system carrying the camera. Despite advances in drone stabilisation technology, for example, drones are still subject to turbulence that is not easily corrected for when stabilising a camera. To provide stable footage that is suitable for direct use, for example for viewing on a head set, recordings tend to require extensive post-production editing.

A further problem with existing stabilisation systems for video cameras is, when obtaining footage that needs to have a 360° field of view, the size of existing mounts tends to be too large to place the cameras (typically 3 or more) close enough to allow for seamless and straightforward stitching together of video footage. The closer the cameras can be positioned together, the easier it is to stitch video footage together.

It is known to provide passive stabilisation systems to attempt to minimise unwanted movement of camera systems. Typically, these involve simple passive vibration damping. Such systems are slow to react to movement, and have limited effect. More advanced stabilisation systems, such as that disclosed in US2014/0270744 A1, use motors to actively stabilise a payload. Such systems, however, can be large and heavy, and not particularly suitable for capturing 360 degree footage due to the mount being in shot for much of the view, and so are not ideal for use with small drones or in other applications where size and weight are important or critical factors.

SUMMARY

In accordance with a first aspect of the invention there is provided an active stabilisation system comprising:

a first motor having a stator connected to a system mount and a rotor configured for rotation about a first axis in a first plane of rotation passing through the first motor;

a second motor having a stator connected with a first connection link to the rotor of the first motor and a rotor configured for rotation about a second axis in a second plane of rotation passing through the second motor, the second plane of rotation intersecting with the first motor;

a third motor having a stator connected with a second connection link to the rotor of the second motor and a rotor configured for rotation about a third axis in a third plane of rotation passing through the third motor; and a payload mount connected to the rotor of the third motor and configured for attachment to a payload.

The first axis may be orthogonal to the second axis. The second axis may additionally or alternatively be orthogonal to the third axis.

In some embodiments, the third plane of rotation may intersect with the second motor. In alternative embodiments, the second plane of rotation may intersect with the third motor.

By using this arrangement of motors, the size of the system can be reduced. Only two, relatively small, connection links are required to connect the motors together, thereby reducing the size and weight of the system. Additionally this arrangement gives the system an inherent balance, as moments acting around the second and third motors, for example due to the weight and inertia of an attached payload, are reduced. The stabilisation system according to the invention therefore may by ideal for stabilising camera systems on drones or for other applications where size and weight are important factors.

The first axis may intersect with the second motor. Where the second plane of rotation intersects with the third motor, the third axis may additionally intersect with the second motor. Alternatively, in embodiments where the third plane of rotation intersects with the second motor, the second axis may additionally intersect with the third motor. Such embodiments provide for a smaller overall size, and for improved balance in relation to moments acting on the second and third motors.

The first axis, second axis, and third axis may intersect at a common point. Such an arrangement may increase the inherent balance of the system. The common point may be within the stator of the second motor.

The second connection may comprise a first section connected to the rotor of the second motor, a second section connected to the stator of the third motor, and a right-angled joint connecting the first and second sections. This arrangement allows the second and third motors to be arranged so as to reduce the moment around the second motor due to the third motor.

The system may further comprise an electrical slip ring mounted between the rotor of the first motor and the first connection link. The slip ring comprises electrical connections for providing electrical signals to the second and third motors, such as inertial measurement signals, electrical power for each camera and video downlink signals from each camera. The first connection link may have a lumen through which the electrical connections may pass. The slip ring allows the second and third motors to be connected to a power source that is stationary relative to the stator of the first motor, without limiting the range of motion of the first motor. Typically the first motor may rotate freely throughout a 360° rotation, while the second and third motors only require to be rotated through 90° or less. Flexible cable connectors can therefore be used to transmit electrical connections to the second and third motors. The power source may be included in the stabilisation system, or may be an external power source.

The payload mount may comprise a plurality of walls defining an inner volume. The second and third motors may be located substantially within the inner volume of the payload mount. Each of the plurality of walls may be provided with a mounting point for a payload such as a camera. The mounting points may be located at positions that are substantially rotationally symmetrical around the centre of the inner volume. The payload mount is preferably balanced to minimise any rotational moment about the second axis.

A plurality of cameras may be connected to the payload holder, so that a complete 360° field of view may be recorded. The small size of the stabilisation system allows the second and third motors to fit within a small inner volume of the payload mount, providing a central, minimally sized pivot area. The plurality of cameras may thereby be held and stabilised with a minimum amount of space between the cameras by having the working parts of the stabilisation system within the camera array rather than around the camera. The effect is to maximising the field of view and minimise problems in the quality of recorded footage due to differences in perspective of each camera.

The payload mount may alternatively be adapted to hold a single payload, for example a single camera, and may be additionally balanced to accommodate for the weight of the single camera.

For operational use, the stabilisation system comprises a control system comprising a three axis gyroscope, a power source and a motor controller unit, the motor controller unit being configured to provide signals to each of the motors to maintain the payload mount in a set position in dependence on signals received from the gyroscope. The control system may be provided within, or mechanically connected to, the system mount.

The control system may comprise a transceiver with an antenna for transmitting and receiving wireless signals for controlling the positions of the motors. For example, when the stabilisation system is mounted on a remote controlled aircraft, such as a drone, the orientation of the payload mount may be remotely controllable to control the field of view of the camera (or cameras). In the case of a panoramic 360° field of view application, no such control may be needed. Such control can, however, be used to rotate the camera array to assist with synchronising footage being captured from multiple camera arrays.

According to a second aspect of the invention there is provided a camera system comprising an active stabilisation system according to the first aspect of the invention; and one or more cameras attached to the payload mount.

The camera system may comprise a plurality of cameras attached to the payload mount, wherein the plurality of cameras are arranged to provide a 360° combined field of view. Advantages of this arrangement include providing a minimally obstructed view of the surroundings and a minimal parallax difference between cameras.

According to a third aspect of the invention there is provided an active stabilisation system comprising:

a first motor having a stator and a rotor configured for rotation about a first axis;

second and third motors having stators connected with a first connection link to the rotor of the first motor and rotors configured for rotation about a second axis, the first axis passing between the second and third motors;

fourth and fifth motors having stators connected with a second connection link to the rotors of the second and third motors and rotors configured for rotation about a third axis, the second axis passing between the fourth and fifth motors; and a payload mount connected to the rotors of the fourth and fifth motors and configured for attachment to a payload.

The first axis may be orthogonal to the second axis and/or the second axis may be orthogonal to the third axis.

The first, second and third axes may intersect at a common point between the second and third motors and between the third and fourth motors.

The system may further comprise an electrical slip ring mounted between the rotor of the first motor and the first connection link, the electrical slip ring comprising electrical connections for providing electrical signals to the second, third, fourth and fifth motors.

The first connection link may comprise a lumen through which the electrical connections pass.

The payload mount may comprise a plurality of walls defining an inner volume. The second, third, fourth and fifth motors may be located substantially within the inner volume of the payload mount. The plurality of walls may comprise a respective plurality of mounting points each adapted to hold a payload, for example a camera.

The mounting points may be located at positions substantially rotationally symmetrical around the first axis.

The system may comprise a control system comprising a three axis gyroscope, a power source and a motor controller unit, the motor controller unit being configured to provide signals to each of the motors to maintain the payload in a set position in dependence on signals received from the gyroscope.

The control system may comprise a transceiver with an antenna for transmitting and receiving wireless signals for controlling the motors.

In accordance with fourth aspect of the invention there is provided a camera system comprising an active stabilisation system according to third aspect and one or more cameras attached to the payload mount.

The camera system may comprise a plurality of cameras attached to the payload mount, the plurality of cameras arranged to provide a 360° combined field of view.

In accordance with a fifth aspect of the invention there is provided an active stabilisation system comprising:

a system mount;

first and second motors having stators connected with a first connection link to the system mount and rotors configured for rotation about a first axis;

third and fourth motors having stators connected with a second connection link to the rotors of the first and second motors and rotors configured for rotation about a second axis orthogonal to the first axis; and a payload mount passing between and connected to the rotors of the third and fourth motors and configured for attachment to a payload.

The first and second axes may intersect at a common point between the first and second motors and between the third and fourth motors.

The payload mount may extend between the third and fourth motors and along a third axis orthogonal to the first and second axes, the payload mount being configured for attachment to a payload at opposing ends along the third axis.

The system may comprise a control system comprising a two or three axis gyroscope, a power source and a motor controller unit, the motor controller unit being configured to provide signals to each of the motors to maintain the payload mount in a set position in dependence on signals received from the gyroscope.

The control system may comprise a transceiver with an antenna for transmitting and receiving wireless signals for controlling the motors.

In accordance with a sixth aspect of the invention there is provided a camera system comprising an active stabilisation system according to the fifth aspect and one or more cameras attached to the payload mount.

The camera system may comprise a plurality of cameras attached to the payload mount, the plurality of cameras arranged to provide a 360° combined field of view.

The advantages mentioned above in relation to the first aspect may also apply to the second or third aspects.

In any of the above aspects the motors may be DC brushless motors.

BRIEF DESCRIPTION OF THE DRAWINGS

The invention is described in further detail below by way of example and with reference to the accompanying drawings, in which.

DETAILED DESCRIPTION OF ILLUSTRATIVE EMBODIMENTS

Many different systems for stabilising video cameras are currently available, examples being the DJI Ronin (www.dji.com) or Freefly Movi (freeflysystems.com). Such systems all have motors positioned on the side, behind and above or below the camera body. An important difference between these existing systems and the systems according to the embodiments described herein is that stabilisation is effected within a small body. This is particularly useful when stabilising multiple cameras, as the stabilisation fits within a space inside the camera array. Using traditional camera stabilisers, such as those mentioned above, for capturing 360 degree footage with multiple cameras would involve a significant amount of the mount being in shot. The various aspects of the invention are intended to address this particular problem, among others.

Figure 1A:
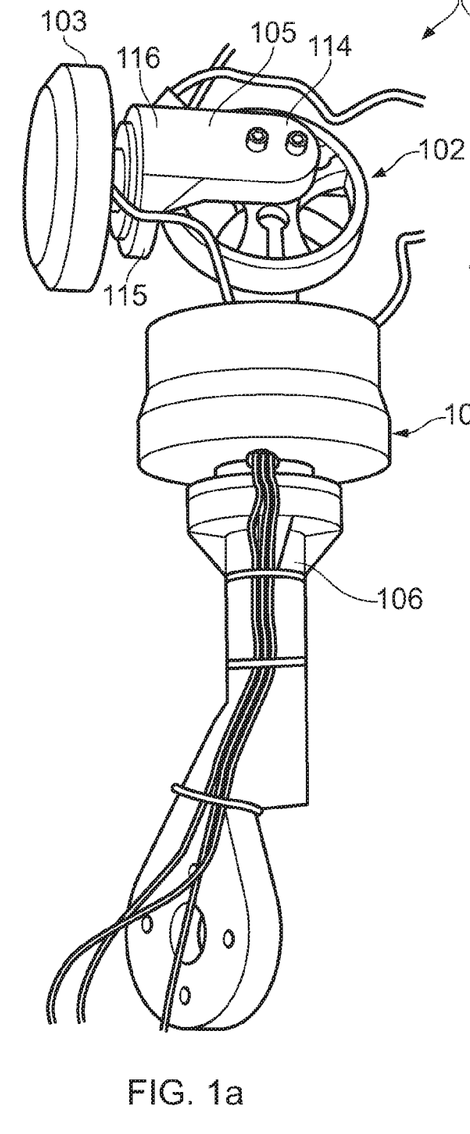
FIG. 1a is a photograph of an exemplary active stabilisation system.
Figure 1B:
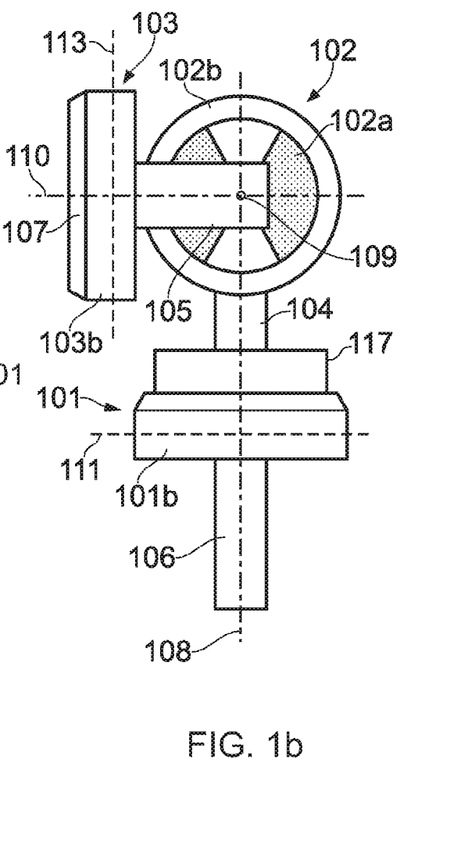
FIG. 1b is a schematic diagram of a side view of the active stabilisation system of FIG. 1a, illustrating various key component parts.

FIG. 1a is a photograph of an exemplary active stabilisation system 100, and FIG. 1b shows the stabilisation system 100 in schematic side elevation view. The stabilisation system 100 comprises a first motor 101, a second motor 102, and a third motor 103. Motors 101, 102, and 103 may for example be DC brushless motors, which are advantageous due to their compact low profile form, but other types of motor may alternatively be used. Each motor 101, 102, 103 comprises a stator and a rotor. The stator 102a of the second motor 102 is connected with a first connection link 104 to the rotor 101b of the first motor 101. The stator of the third motor 103 is connected with a second connection link 105 to the rotor 102b of the second motor 102. In this way, the motors 101, 102, 103 allow stabilisation system 100 to rotate a payload around 3 separate axes.

In the embodiment of FIGS. 1a and 1b, the first connection link 104 is connected to the rotor 101b of the first motor via a slip ring 117. The slip ring 117 allows electrical connections for the second and third motors 102, 103 to pass through the first motor while allowing the rotor 101b of the first motor to rotate freely. Electrical connections to the second and third motors 102, 103 may for example be made via flexible cable connections, since the degree of rotation required for the second and third motors is substantially less than that required for the first motor 101.

The stator of the first motor 101 is connected to a system mount 106. The system mount 106 is adapted to allow the system 100 to be mounted to a desired carrier. For example the carrier may be a person, an animal, a ground vehicle or an aircraft such as a drone.

Figure 3A:
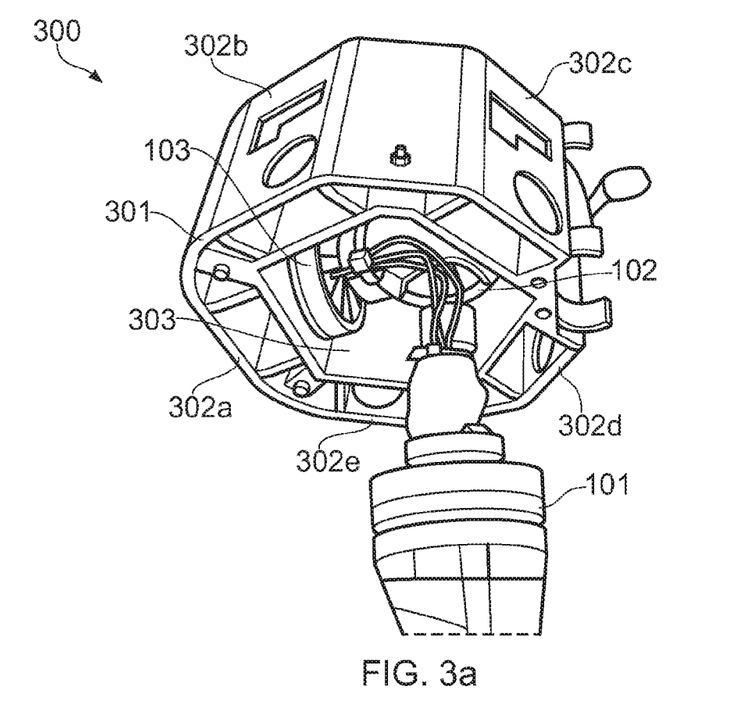
FIG. 3a is a photograph of an active stabilisation system with a panoramic camera mount.

The rotor 103b of the third motor 103 is connected to a payload mount 107. The payload mount 107 may be adapted to attach a payload to the system 100. For example, the payload mount 107 may be a simple holder for a payload, or may provide a plurality of payload compartments, as shown in the embodiment illustrated in FIG. 3, described in further detail below.

The rotor 101b of the first motor 101 is rotatable about a first axis 108, with a plane of rotation 111 passing through the first motor 101. The rotor of the second motor 102 rotates around a second axis 109, with a plane of rotation (not shown) passing through the second motor 102. The rotor of the third motor 103 rotates around a third axis 110, with a plane of rotation 113 passing through the third motor 103. In the particular embodiment shown in FIGS. 1a and 1b, the motors 101, 102, 103 are arranged such that the first axis 108 and the third axis 110 both intersect with the second motor 102. The first and second axes are orthogonal to each other. The second and third axes are also orthogonal to each other.

In the embodiment of FIGS. 1a and 1b, the plane of rotation of the second motor 102 passes through the first motor 101. This keeps the centre of mass of the second motor 102 close to the rotational axis 108 of the first motor 101, thereby maintaining the second motor 102 in balance while it rotates about the first axis 108. The plane of rotation of the second motor 102 also passes through the third motor 103. This keeps the payload mount 107 facing outwards and ensures that the plane of rotation 113 of the third motor 103 does not intersect with the first motor 101, minimising any interference with the first motor 101 when the payload rotates about the first axis or the third axis 110.

With the first axis 108 mounted nominally vertically, rotation of the first motor 101 causes a pan motion of a camera payload attached to the payload mount 107, while rotation of the second motor 102 causes a tilt motion of the camera payload. Rotation of the third motor 103 about the third axis 110 causes a yaw motion of the camera payload. Control of the motors 101, 102, 103 allows for motion of the payload to be compensated for around each axis.

Figure 1C:
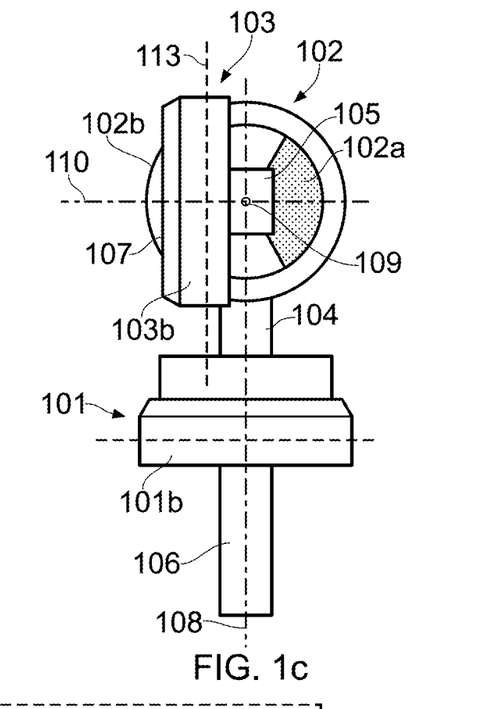
FIG. 1c is a schematic diagram of a side view of an alternative embodiment of an active stabilisation system.

In an alternative embodiment, illustrated schematically in FIG. 1c, the plane of rotation 113 of the third motor 103 may intersect with the second motor 102. The effect of this is the same as in the embodiment in FIGS. 1a and 1b. Since the plane of rotation 113 now also passes through the first motor 101, the payload mount 107 may be configured to mount a payload on the periphery of the third motor such that rotation of the second motor 102 provides the yaw motion while rotation of the third motor 103 provides the tilt motion.

In the embodiment shown in FIGS. 1a and 1b, the first axis 108, second axis 109 and third axis 110 may intersect at a common point. Preferably the common point is located within the second motor 102. This arrangement thereby provides an improved inherent balance to the system 100, requiring a minimum of additional weight balancing when attaching a payload.

The particular relative arrangement of the first motor 101, second motor 102 and third motor 103 provides for a small and lightweight stabilisation system, and with a small number of components.

Although in the embodiment shown in FIGS. 1a and 1b the first axis and the third axis pass through the second motor, this is not required. More generally, the advantages of the invention may still be achieved if a plane of rotation that is orthogonal to the second axis 109, and that passes through the second motor 102, also passes through the first motor 101. This is the arrangement in FIG. 1c.

The first and second connection links 104, 105 are shaped to hold the motors 101, 102, 103 in their relative positions. In FIGS. 1a and 1b, the second connection link 105 is "L" shaped in order to provide an arrangement of the second 102 and third 103 motors where the third axis 110 passes through the second motor 102. The rotor 102b of the second motor 102 is connected to a first section 114 of the second connection link 105. The stator of the third motor 103 is connected to a second section 115 of the second connection link 105. The first section 114 and second section 115 are joined by a substantially right-angled joint 116. The first connection link 104 may be similar to the second connection link 105.

The motors 101, 102, 103 may be powered from a power source, such as a battery pack. The power source may be included in the stabilisation system, for example the power source may be located between the stator of the first motor 101 and the system mount 106. Alternatively the power source may be located externally to the stabilisation system, for example on the carrier system carrying the stabilisation system and payload. In this case, the stabilisation system may comprise a power connector to connect an external power source to the motors 101, 102, 103.

Figure 2:
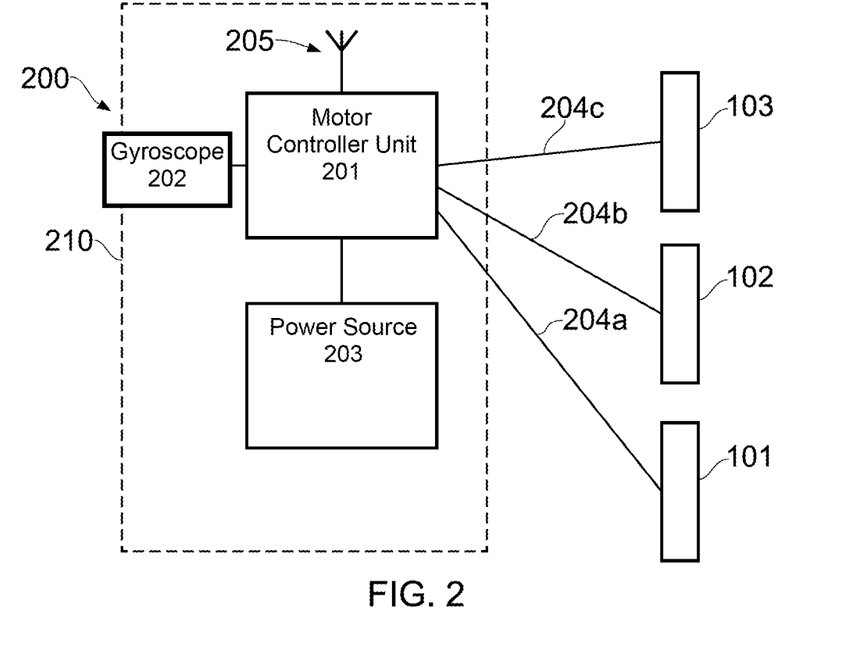
FIG. 2 is a schematic diagram of a stabilisation system comprising a control system.

FIG. 2 illustrates schematically an exemplary stabilisation system 200 comprising three motors 101, 102, 103 and a control system 210 comprising a three axis gyroscope 202, a power source 203 and a motor controller unit 201. The motor controller unit 201 is connected to each of the motors 101, 102, 103 with electrical connections 204a-c and configured to provide signals to each of the motors 101, 102, 103 to maintain each of the motors 101, 102, 103 in a set position in dependence on signals received from the gyroscope 202. The control system 210, or at least the gyroscope 202, may be provided within, or mechanically connected to, the system mount 106 so that any movement of the system mount 106 can be compensated for by controlling the relative positions of the motors 101, 102, 103.

The control system 210 may comprise a transceiver with an antenna 205 for transmitting and receiving wireless signals for controlling the positions of the motors 101, 102, 103. For example, when the stabilisation system 200 is mounted on a remote controlled aircraft such as a drone, the orientation of the payload mount 107 may be remotely controllable to control the field of view of the camera or cameras. In the case of a panoramic 360° field of view application, no such control may be needed, since the only requirement of the system is to maintain the cameras level relative to the ground.

The motor control unit 201 may for example comprise a commercially available 3-dimensional gimbal control board, such as the AlexMos V3 board (32 bit processor), available from Desire RC UK (desirerc.co.uk). The gyroscope 202 may be provided as part of the control unit 201 or may be a separate component.

Figure 3B:
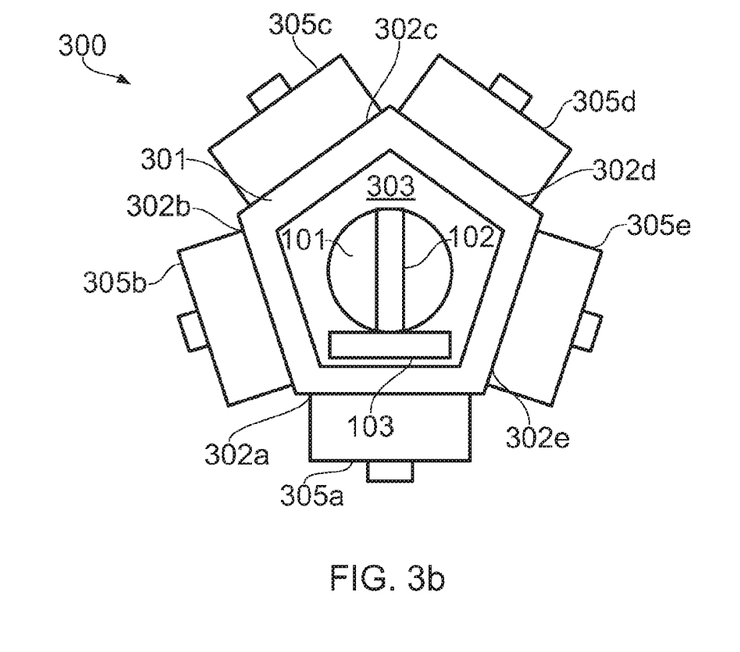
FIG. 3b is a schematic plan view of the active stabilisation system of FIG. 3a, with a plurality of cameras connected to the camera mount.

FIG. 3a shows a photograph of an exemplary stabilisation system 300 having the features of the embodiments of FIGS. 1a and 1b together with a payload mount 301 adapted to hold a plurality of payload units, typically cameras. FIG. 3b shows the stabilisation system in schematic plan view. The payload mount 301 comprises a plurality of walls 302a-e that together enclose an inner volume 303 within which the second and third motors 102, 103 are located. A plurality of payload mounts 304a-e are provided on the respective walls 302a-e, each mount being adapted to hold an individual payload unit. The overall size of the stabilisation system is sufficiently small to allow multiple cameras to be mounted to the payload mount 301 such that their fields of view overlap and the image planes of the cameras are close together. Using typically available motors, such as DC brushless motors, the overall dimension across the diameter of the payload mount, i.e. the maximum distance between any two payload mounting points, may be less than 15 cm or less than 10 cm, and may in some cases be as small as 5 cm.

FIG. 3b shows a plurality of cameras 305a-e mounted on the payload mount 301. In this illustrated embodiment, the payload mount 301 is configured to allow mounting of five payloads located rotationally symmetrically around a central axis of the inner volume 303 (which may be coincident with the first axis 108: FIG. 1b), in order to balance the weights of payload units connected to the payload mount 301 around the first axis 108 and about the second axis 109.

Suitable cameras for use with the stabilisation system disclosed herein include those available from GoPro, Inc. (gopro.com), such as the GoPro Hero series cameras.

The second 102 and third 103 motors are contained within the inner volume 303. Because of the small size of the arrangement of motors provided by this embodiment, the second 102 and third motors 103 can fit within this small inner volume 203, creating a central, minimally sized pivot area. The payload mounts 304a-e may therefore be located close together, allowing the fields of view of each of the cameras 305a-e to be stitched together more easily. Stitching together of recorded or live video from the cameras may be done using commercially available software, for example using Autopano Video, available from Kolor (www.kolor.com) or Vahana VR, available from VideoStitch.

Figure 4:
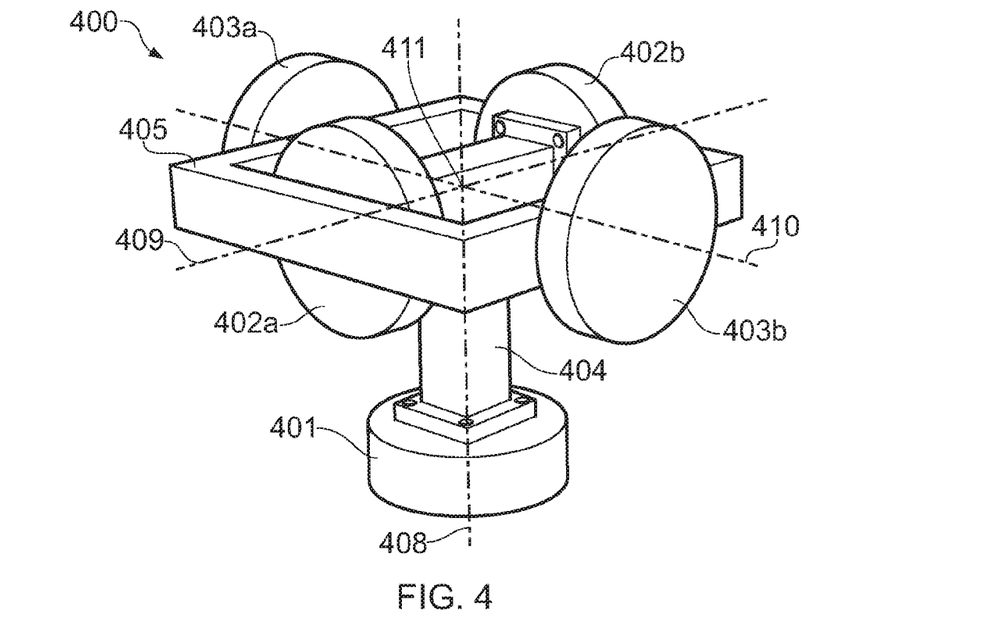
FIG. 4 is a schematic drawing of an alternative embodiment of an active stabilisation system.

FIG. 4 is a schematic drawing of an alternative example embodiment of a stabilisation system 400. Instead of a single motor for control of a payload about the second and third axes, in this embodiment the system 400 comprises two pairs of motors 402a, 402b and 403a, 403b for controlling rotation about the second and third axes 409, 410. A first motor 401, which may be mounted to a system mount (not shown) controls rotation about the first axis 408. A first connection link 404 connects the rotor of the first motor 401 to the stators of the second and third motors 402a, 402b. The first axis 408 passes between the second and third motors 402a, 402b. The second and third motors 402a, 402b are configured for rotation about the second axis 409.

The fourth and fifth motors 403a, 403b have their stators connected with a second connection link 405 to the rotors of the second and third motors 402a, 402b and are configured for rotation about the third axis 410. The second axis passes between the fourth and fifth motors.

As with the embodiments described above in relation to FIGS. 1 to 3, an electrical slip ring may be mounted between the rotor of the first motor 401 and the first connection link 404, the electrical slip ring providing connections for electrical signals to be provided to, and received from, the second, third, fourth and fifth motors 402a, 402b, 403a, 403b. The first connection link 404 may comprise a lumen through which the electrical connections pass.

A payload mount (not shown in FIG. 4) is connected to the rotors of the fourth and fifth motors and is configured for attachment to a payload.

In the embodiment shown, the first axis 408 is orthogonal to the second axis 409, and the second axis 409 is orthogonal to the third axis 410. The first, second and third axes 408, 409, 410 intersect at a common point 411 between the second and third motors 402a, 402b and between the third and fourth motors 403a, 403b. This arrangement allows for the system to be optimally balanced so as to minimise unbalanced moments about the second and third axes 409, 410 due to the weight and inertia of the payload.

In the illustrated embodiment in FIG. 4, the second and third motors 402a, 402b are arranged symmetrically about the first axis 408. The first connection link 404 is in the form of a T section connecting the stators of the second and third motors 402a, 402b together along the second axis 409 and to the rotor of the first motor 401 along the first axis 408.

The fourth and fifth motors 403a, 403b are also arranged symmetrically about the first axis 408. The second connection link 405 is in the form of a ring connecting the rotors of the second and third motors 402a, 402b to the stators of the fourth and fifth motors 403a, 403b such that the fourth and fifth motors 403a, 403b are rotatable about the second axis 409.

Figure 5:
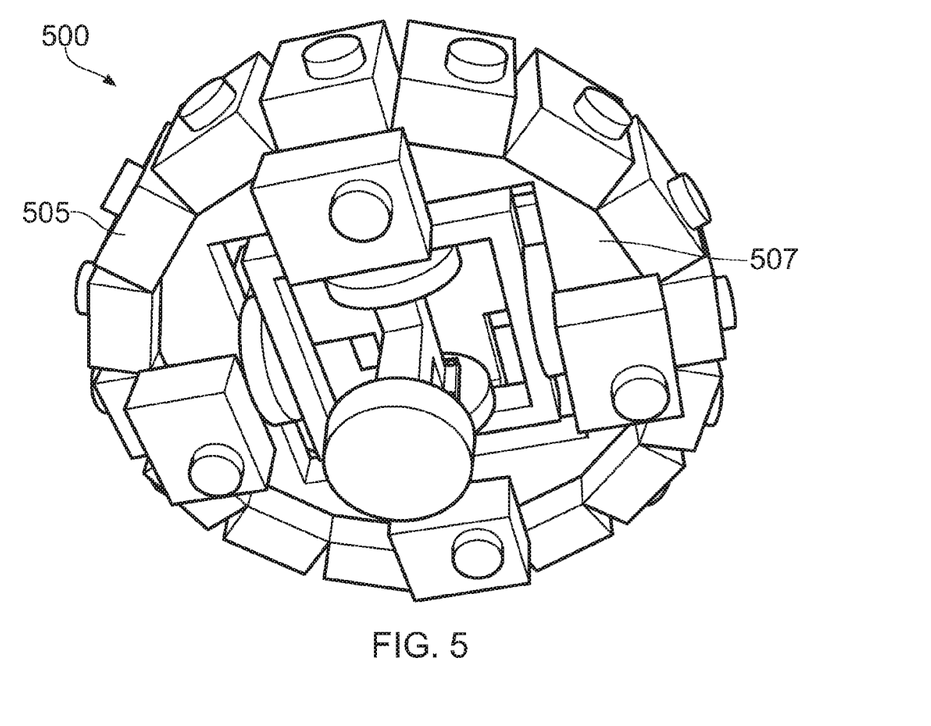
FIG. 5 is a schematic drawing of the system of FIG. 4 with cameras mounted to a payload mount, as viewed from below.
Figure 6:
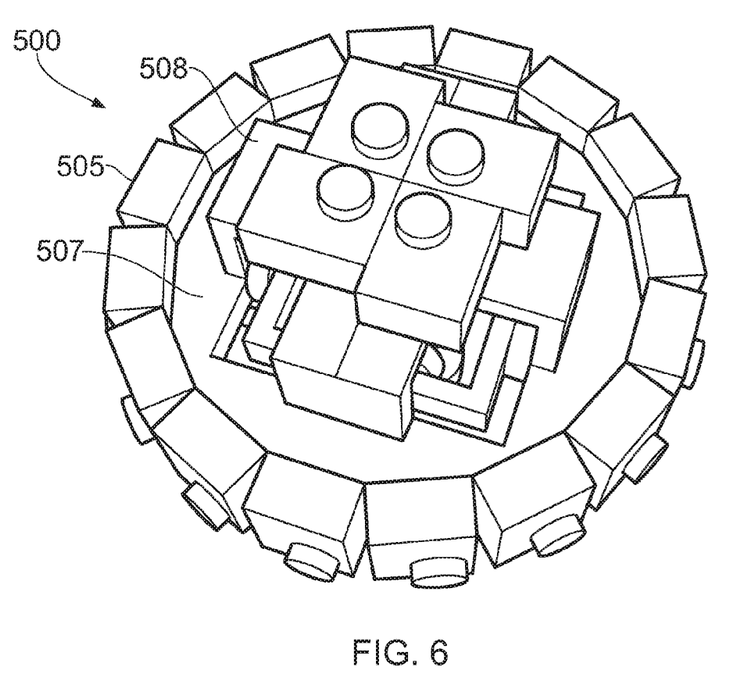
FIG. 6 is a schematic drawing of the system of FIG. 4 with cameras mounted to a payload mount, as viewed from above.

FIG. 5 shows the stabilisation system 400 of FIG. 4 with the fourth and fifth motors 403a, 403b mounted to a payload mount 507. As with the embodiment of FIG. 3, the payload mount 507 comprises a plurality of walls defining an inner volume, within which the second, third, fourth and fifth motors are located. In the illustrated embodiment, a number of cameras 505 are connected to the payload mount. A first set of cameras is mounted to a corresponding plurality of mounting points around the periphery of the payload mount 507. As shown in the view in FIG. 5, a further set of cameras is mounted to a first side of the payload mount 507, i.e. facing in a direction parallel to the first axis. FIG. 6 shows another view of the same system 500, showing a further set of cameras mounted to a second opposing side of the payload mount 507, the further set of cameras facing in a direction parallel to the first axis in an opposite direction. A bracket 508 allows the further set of cameras to be positioned over the stabilisation system. Together, the cameras 505 allow for an almost completely spherical view, with only the system mount, which will typically be mounted to a drone or other moving vehicle, obstructing a small portion of the overall view.

Figure 7:
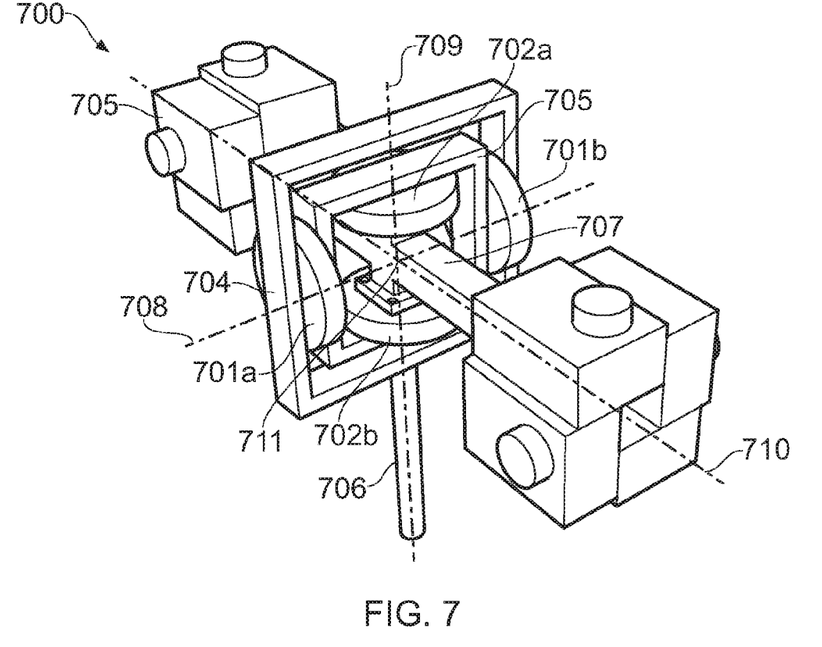
FIG. 7 is a schematic drawing of an alternative embodiment of an active stabilisation system.

FIG. 7 illustrates an alternative example embodiment of an active stabilisation system 700, in which a payload is stabilised about two orthogonal axes using an arrangement of motors similar to that described above in relation to FIG. 4. In the illustrated embodiment, the system 700 comprises a system mount 706 connected to the stators of first and second motors 701a, 701b with a first connection link 704. The first connection link is in the form of a ring surrounding the first and second motors 701a, 701b. In alternative embodiments the first connection link and system mount may together be in the form of a Y shaped connection, with the first and second motors 701a, 701b connected to opposing arms.

The system 700 of FIG. 7 may be used for example in providing a stabilised camera system for capturing wide field stereoscopic footage.

The first and second motors 701a, 701b are configured for rotation about a first axis 708. The rotors of the first and second motors 701a, 701b are connected with a second connection link 705 to the stators of third and fourth motors 702a, 702b. The third and fourth motors 702a, 702b are configured for rotation about a second axis 709 orthogonal to the first axis 708.

A payload mount 707 is connected to the rotors of the third and fourth motors 702a, 702b and passes between the second and third motors. The payload mount 707 is configured for attachment to a payload, for example a plurality of cameras 705. The cameras 705 in FIG. 7 are arranged on opposing ends of the payload mount 707 and oriented to provide a 360° view around the axis of the payload mount 707.

The first and second axes 708, 709 intersect at a common point 711 between the first and second motors 701a, 701b and between the third and fourth motors 702a, 702b. The common point also lies within the payload mount 707. The payload mount 707 extends between the third and fourth motors 702a, 702b along a third axis 710 orthogonal to the first and second axes 708, 709.

Figure 8:
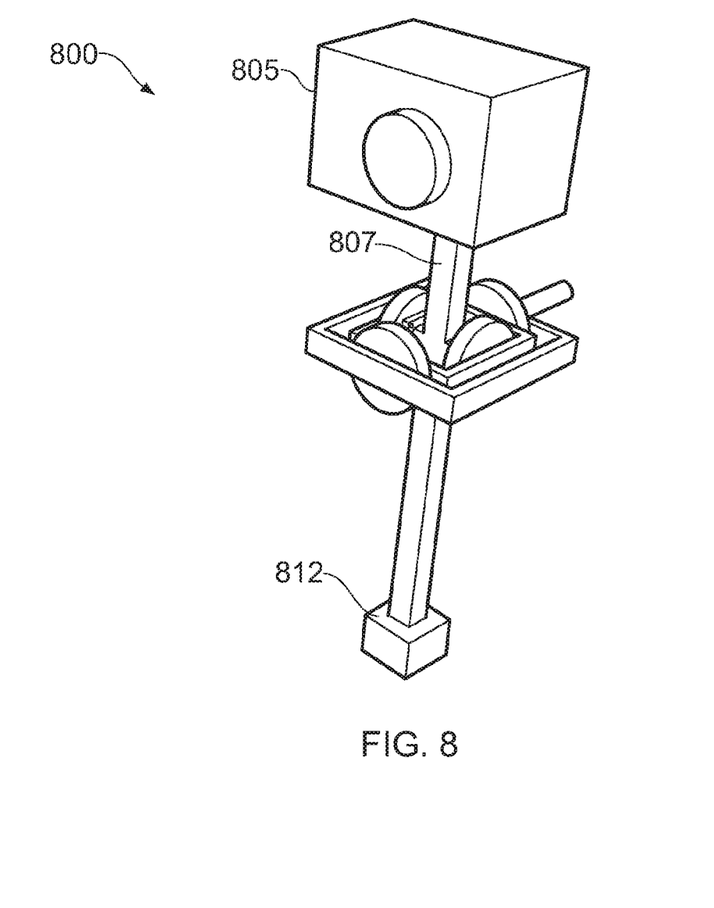
FIG. 8 is a schematic drawing of a further alternative embodiment of an active stabilisation system.

FIG. 8 illustrates an alternative example embodiment of a stabilisation system 800 similar to that of FIG. 7. The various components of the system 800 are the same as those in FIG. 7, except that the system is configured to stabilisation of a single camera 805 at one end of the payload mount 807. A counterweight 812 is provided at the opposing end of the payload mount 807. This arrangement may be used for active stabilisation of a video camera in a way similar to the well-known Steadicam (available from, and a registered trade mark of, The Tiffen Company, LLC). An advantage of the arrangement is in its reduced size and complexity.

Other embodiments are intentionally within the scope of the invention as defined by the appended claims.

Although the present invention has been described with reference to preferred embodiments, workers skilled in the art will recognize that changes may be made in form and detail without departing from the spirit and scope of the invention.

The invention claimed is:

1. An active stabilisation system comprising:
a system mount;
first and second motors having stators connected with a first connection link to the system mount and rotors configured for rotation about a first axis;
third and fourth motors having stators connected with a second connection link to the rotors of the first and second motors and rotors configured for rotation about a second axis orthogonal to the first axis; and a payload mount passing between and connected to the rotors of the third and fourth motors, wherein the payload mount extends between the third and fourth motors and along a third axis orthogonal to the first and second axes, the payload mount being configured for attachment to one or more cameras at one or both opposing ends of the payload mount.

2. The system of claim 1, wherein the first and second axes intersect at a common point between the first and second motors and between the third and fourth motors.

3. The system of claim 1 comprising a control system comprising a two or three axis gyroscope, a power source and a motor controller unit, the motor controller unit being configured to provide signals to each of the motors to maintain the payload mount in a set position in dependence on signals received from the gyroscope.

4. The system of claim 3 wherein the control system comprises a transceiver with an antenna for transmitting and receiving wireless signals for controlling positions of the motors.

5. A camera system comprising an active stabilisation system according to claim 3 and one or more cameras attached to the payload mount.

6. The camera system of claim 5 comprising a plurality of cameras attached to the payload mount, the plurality of cameras arranged on opposing ends of the payload mount to provide a 360° combined field of view.

7. The system of claim 1, wherein the motors are DC brushless motors.

8. The camera system of claim 5 comprising a camera mounted at one end of the payload mount and a counterweight at an opposing end of the payload mount.

* * * * *